United States Patent [19]

Otters

[11] Patent Number: 4,912,995
[45] Date of Patent: Apr. 3, 1990

[54] THRUST TO TORQUE CONVERTER, PARTICULARLY FOR COUPLING A RECIPROCATING SHAFT TO A ROTARY ELECTRICAL GENERATOR OR THE LIKE

[76] Inventor: John L. Otters, 11317 Miller Rd., Whittier, Calif. 90604

[21] Appl. No.: 261,097

[22] Filed: Oct. 24, 1988

[51] Int. Cl.⁴ .............................................. F16H 29/12
[52] U.S. Cl. ..................................... 74/127; 74/129; 74/132; 290/1 C
[58] Field of Search ................. 74/127, 129, 132, 128, 74/130, 131; 290/1 R, 1 C; 318/14

[56] References Cited

U.S. PATENT DOCUMENTS

| | | | |
|---|---|---|---|
| 478,795 | 7/1892 | Hummel | 74/110 |
| 598,681 | 2/1898 | Root | 74/127 |
| 2,643,614 | 6/1953 | Rosenkrans | 74/127 |
| 3,192,783 | 7/1965 | Cruzan | 74/127 |
| 3,412,995 | 11/1968 | Parups | 74/33 |
| 4,227,092 | 10/1980 | Campagnudo et al. | 290/1 C |
| 4,263,825 | 4/1981 | Guslits | 74/127 X |
| 4,282,442 | 8/1981 | Massinger | 290/1 C |
| 4,614,875 | 9/1986 | McGee | 290/1 C X |
| 4,638,633 | 1/1987 | Otters | 60/518 |
| 4,753,078 | 6/1988 | Gardner, Jr. | 60/668 |

Primary Examiner—Allan D. Herrmann
Assistant Examiner—Janice E. Chartoff
Attorney, Agent, or Firm—Natan Epstein; William H. Pavitt, Jr.

[57] ABSTRACT

A rotary-to-linear mechanical motion converter has a housing attachable to a drive engine, an input shaft reciprocable to the housing and coupled directly or through a gear arrangement to a reciprocating output shaft of the drive engine, a first drive train coupling the input shaft for turning a rotor in a given sense of rotation for a first direction of movement of the input shaft, and a second drive train coupling the input shaft for turning the rotor in the same given sense of rotation for an opposite direction of movement of the input shaft, the first and second drive trains alternately driving the rotor, as in an electrical generator, for continuous rotation in a given sense relative to the housing. In an alternate converter, both drive trains drive a rotor for only one direction of movement of the input shaft.

20 Claims, 5 Drawing Sheets

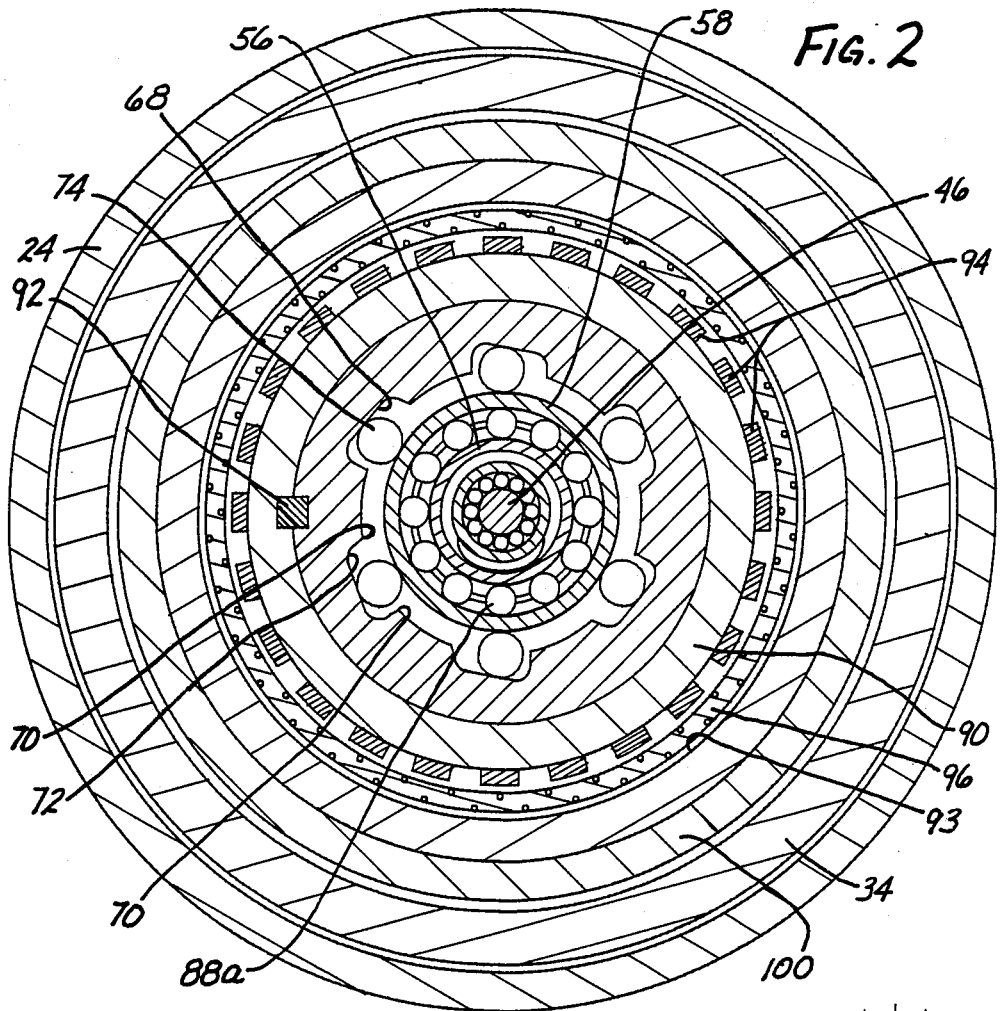
FIG. 2
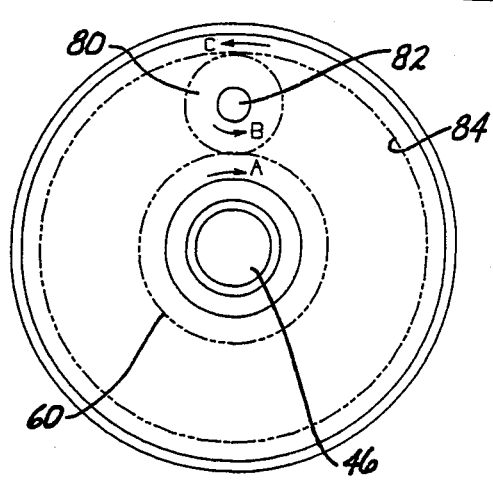
FIG. 3
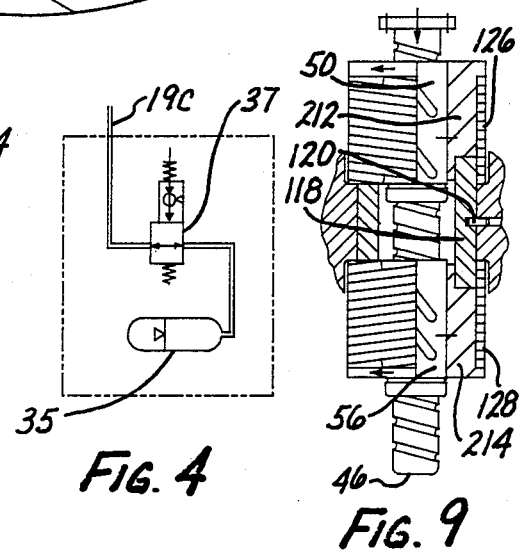
FIG. 4
FIG. 9

THRUST TO TORQUE CONVERTER, PARTICULARLY FOR COUPLING A RECIPROCATING SHAFT TO A ROTARY ELECTRICAL GENERATOR OR THE LIKE

BACKGROUND OF THE INVENTION

1. Field of the Invention

The present invention pertains generally to the field of mchanical linear-to-rotary motion converters and more particularly discloses a compact mechanism for converting reciprocating linear motion to one-directional rotation to which may be integrated an electrical generator.

2. Background of the Invention

Although numerous mechanisms for converting linear to rotary motion are known, a continuing need exists for such converters characterized by greater simplicity, compact dimensions, high mechanical efficiency, construction using readily available parts insofar as possible for low cost, easy serviceability, and reliability. Such a mechanical converter unit is particularly desirable for intergration with external combustion engines, such as Stirling cycle engines, of the type where a heat input drives a reciprocating mechanical output shaft. This applicant is not aware of existing linear to rotary mechanical motion converters similar to the system described below.

SUMMARY OF THE INVENTION

The motion converter of this invention has a housing, an input shaft reciprocably mounted to the housing, a first drive train coupling the input shaft for turning a rotor in a given sense of rotation for a first direction of movement of the input shaft, and a second drive train coupling the input shaft for turning the rotor means in the same given sense of rotation for an opposite direction of movement of the input shaft. The first and second drive trains alternately drive the rotor for continuous rotation in the given sense relative to the housing. In a particular application of the novel system a compact electrical generator is obtained by providing a stator winding fixed to the housing and a commutator magnet arrangement carried by the rotor for converting linear reciprocating motion of the input shaft to an electrical output.

More specifically, the input shaft is a screw shaft driving first and second ball nuts mounted to the housing in a common sense of rotation for any given direction of movement of the input shaft. The first drive train is a first overrunning clutch drivingly coupling the first ball nut to the rotor for a first sense of rotation of the first ball nut corresponding to a first direction of movement of the screw shaft, and the second drive train includes a ring gear, reversing gears operatively coupling the drive shaft to the ring gear, and a second overrunning clutch drivingly coupling the ring gear to the rotor during rotation of the second ball nut in the first sense but corresponding to an opposite direction of movement of the screw shaft. The first overrunning clutch is inoperative for transmitting rotational motion during rotation of the first ball nut in a sense opposite to the first sense, whereas the second overrunning clutch is similarly inoperative during rotation of the second ball nut in a sense opposite to the first sense, so that the rotor is alternately driven through the first and second overrunning clutches in a single sense of rotation responsive to linear reciprocating motion of the screw shaft.

A further aspect of the invention is the provision of a hydraulic tensioning arrangement combined with a self-aligning bearing between the converter housing, which may be threaded onto an outer shell enveloping the drive engine, and the converter drive assembly so as to apply axially compressive force to the driving engine while tensioning the drive engine's outer shell, in an arrangement such as disclosed in U.S. Pat. Nos. 4,638,633, 4,723,410 and 4,722,188 issued to this applicant. The self-aligning bearing keeps the converter input shaft in axial alignment with the output shaft of the engine driving the converter.

Also disclosed are alternate forms of the converter which make use of overrunning spring clutches for rectifying bidirectional rotation of rollers threaded on the reciprocating input shaft, and transmitting unidirectional rotation to a rotor assembly coaxial with the drive shaft. In one version two rollers operate jointly to drive the rotor assembly for one direction of the drive shaft stroke, the reverse movement of the rollers being lost to the rotor assembly by uncoupling of the overrunning clutches associated with each roller. In another version two rollers operate alternately to couple the reciprocating shaft through corresponding overrunning clutches so as to continuously drive the rotor assembly for both directions of movement of the reciprocating input shaft.

Still another form of the invention has ball nuts rotatably driven by a reciprocating threaded input shaft, the ball nuts being coupled to a rotor assembly by overrunning clutch springs.

BRIEF DESCRIPTION OF THE DRAWINGS

FIG. 2 is an axial cross-section taken along line 2—2 in FIG. 1;

FIG. 3 is a schematic cross-sectional diagram of the reversing gear arrangement incorporated in the converter of FIG. 1 and viewed in the same direction as FIG. 2;

FIG. 4 shows in schematic form a hydraulic pressure accumulator arrangement for returning the power piston of the driving engine during the compression stroke;

FIG. 9 shows in longitudinal view, partially in section, an alternate over-running clutch arrangement for use in a one-directional motion converter such as that of FIG. 5.

DETAILED DESCRIPTION OF THE PREFERRED EMBODIMENTS

Figure 1:
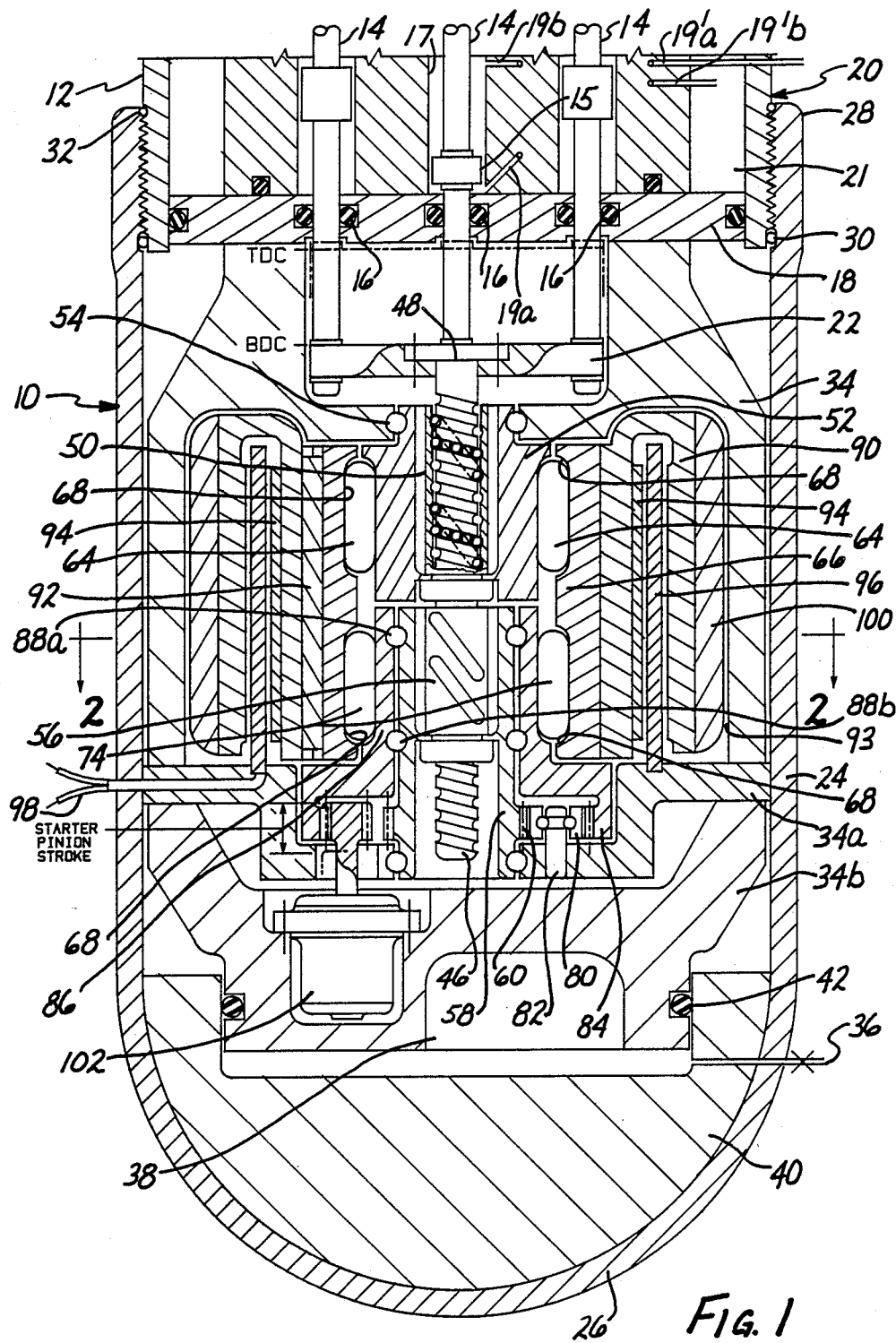
FIG. 1 is a longitudinal cross-section of a bi-directional linear-to-rotary motion converter according to this invention.

With reference to the drawings, FIG. 1 shows the linear-to-rotary converter unit 10 threaded to the work output end of an engine 12 such as a Stirling cycle external combustion engine 20 in which a thermal energy input drives one or more work pistons (not shown)

connected to parallel output shafts 14. Each shaft 14 passes through a ring seal 16 in an end bulkhead 18 of the engine 20, only the end 12 of which is shown as relevant to the attached converter unit 10. The two output shafts 14 are connected at their ends to a common drive plate 22 which reciprocates through a linear stroke between the solid lined BDC position and dotted line TDC position when driven by the engine 20.

The converter unit 10 includes a housing shell 24 with a closed spherical end 26 and an open, internally threaded end 28 which is screwed onto mating threads on the engine end 12. A gas seal ring 30 and a steel snap ring 32 are provided for positively stopping the threading of the housing shell 24 in precise relationship to the engine end 12 to secure a gas tight seal at ring 30.

A supporting framework 34 is urged against the engine bulkhead 18 by hydralic pressure supplied from a suitable pressure reservoir into pressure space 38 defined between the bottom of a piston 34b and a self-aligning spherical end cylinder 40, and sealed by dynamic ring seal 42. A radial locating bulkhead 34a is axially movable within the housing shell 24. The engine bulkhead 18 is axially moveable relative to the outer shell 12 which encloses and contains the drive engine components which may consist of axially assembled elements. The converters here described provide for application of axial force to compress axially adjacent engine components and maintaining gas tight seals between these components against high internal operating pressures, while simultaneously tensioning the outer shell. The space 38 may be pressurized by momentary connection through a quick-disconnect coupling on the conduit 36 to a source of hydraulic pressure.

Different converters may be readily interchanged, for example a converter with an intergrated electrical generator such as disclosed and illustrated herein being replaced on a particular driving engine with a converter having an intergrated hydraulic pump for converting mechanical output to hydraulic pressure. Such interchange requires nothing more than unscrewing the housing 24 of the converter unit 10 and screwing on the similarly threaded housing of the replacement unit on the engine 20.

An input shaft 46 in the form of a ball bearing screw is axially centered in the housing shell 24 with one end 48 affixed to the drive plate 22, such that the input shaft 46 reciprocates with the plate 22 and output shafts 14 and 14' through the aforementioned output stroke of the engine 20.

A first ball bearing nut 50 is fixed within a first drive ring 52 which in turn is longitudinally fixed relative to the frame 34 by means of ball bearings 54. The input shaft 46 and ball bearing nut 50 together make up a ball bearing screw which is a known type of force and motion transfer device, in which the sliding friction of a conventional power screw is replaced with the rolling friction of bearing balls 51. The bearing balls circulate in races formed by concave helical grooves in the screw and nut. All reactive loads between screw and nut are crried by the bearing balls which provide the only physical contact between these members. As the screw and nut rotate relative to each other, the bearing balls are diverted from one end of nut 51 and carried by a ball guide to the opposite end of the ball nut 51. This recirculation permits unrestricted travel of the nut in relation to the screw.

A second ball bearing nut 56 similar to the first ball bearing nut 50 is fixed axially adjacent to the first ball bearing nut 50 within a sleeve 58 which carries near its lower end a central gear 60 and is axially fixed to the radial locating bulkhead 34a by ball bearings 62. The two ball bearing nuts 50, 56 turn in the same direction when the input shaft 46 is driven axially through the two nuts by the drive plate 22.

The first nut 50 converts linear motion of the input shaft 46 to rotation of the first drive ring 52 in a first sense of rotation, which rotation is transmitted to roller bearings 64 held against the cylindrical outer surface of the first drive ring 52 by a cam ring 66. As best seen in FIG. 2, each roller 64 is captive within a corresponding recess 68 defined in the inner surface of the cam ring 66. Each cam recess 68 as seen in the axial cross-section has a clutch wedge surface 70 against which the rollers 64 lock when the first drive ring 52 turns in a clockwise direction in FIG. 2. Rotation of the drive ring 52 in a clockwise direction is thus transmitted by the locked rollers 64 to the cam ring 66 which consequently is driven for clockwise rotation with the drive ring 52 corresponding to e.g. downward linear movement of the input shaft 46 in FIG. 1. For movement of the input shaft 46 in the opposite or upward direction, the drive ring 52 will turn in an opposite or counter-clockwise direction driving the roller bearings 64 towards the opposite edge 72 of the corresponding recesses 68. The trailing edges 72 of each roller recess are shaped so as to present a smooth bearing surface to the rollers 64 allowing the rollers to turn freely against this portion of the cam ring 66. The rotary motion of the drive ring 52 is therefore lost by the rollers 64 and no rotary motion is transmitted to the cam ring 66 during counter-clockwise rotation of the drive ring. The assembly comprising the drive ring 52, roller 64 and cam ring 66 therefore operates as an overrunning clutch, transmitting rotary motion uni-directionally from the ball nut 50 to the outer cam ring 66.

The second ball nut 56 is provided however with a reversing gear arrangement as will be described which operates to drive the cam ring 66 in a direction opposite to the rotation of the ball nut 56. The two overrunning clutches therefore, are operative for transmitting rotational motion in opposite senses from each other. Thus, for a given direction of linear movement of the input shaft 46, and consequently mutually opposite rotation of the two drive rings 52, 86 only one of the overrunning clutches transmits rotation to the cam ring 66. Arbitrarily, for downward movement of the shaft 46, clockwise rotation of the lower ball nut 56 is transmitted to the sleeve 58.

The central gear 60 drives three idler gears 80 which are mounted 90 degrees apart to the bulkhead 34a by gear shafts 82. Each of the idler gears 80 is also in mesh with an outer ring gear 84 integral with an outer drive ring 86 mounted for rotation coaxially to the sleeve 58 by axially spaced ball bearings 88a and 88b. The reversing gear arrangement is better understood by reference to FIG. 3, where the relationship of the three gears is schematically indicated (only one idler gear 80 is shown for clarity). For clockwise rotation of the central gear 60 suggested by the arrow A, the idler gear 80 rotates in the opposite or counter-clockwise direction indicated by arrow B, driving the outer ring gear 84 in the same counter-clockwise direction indicated by arrow C; the net result is that the ring gear 84 rotates in a sense opposite to that of the central gear 60 i.e. the result is a reversal of the sense of rotation of the lower ball nut 56 at the outer drive ring 86.

In order to facilitate engine start-up, it may be desirable to provide a starting motor 102 mounted to the engine lower frame member 34b and coupled for driving the ring gear 84 to impart rotational momentum to the rotor assembly. This is particularly desirable in arrangements where the pitch of the grooves in the ball nut 50 is relatively low, calling for a high torque start-up input from the engine 20 driving the motion converter 10.

FIG. 1 also shows a central piston rod 14' provided with a seal element 15 movable within the bore 17. The engine 20 being preferably of an external combustion, e.g. Stirling type, requires positive means for returning the work piston of the engine (not shown) after the power stroke. Since, in an application such as illustrated, i.e. driving a rotary electrical generator, no such means can be derived from the driven rotor system, it is provided in the illustrated embodiment by a pair of conduits 19b and 19a opening into the bore 17 above and below the seal 15, respectively. The lower conduit 19a may be connected through the outer shell 12 of the engine by means of conduit portion 19a' to the conduit 36a in FIG. 4, leading to the hydraulic pressure accumulator 35 by way of regulator valve 37. The upper conduit 19b connected through corresponding 19b', opens into an annular space 21 enclosed by the engine shell 12, but essentially open to atmospheric pressure. A pressure differential can thus be maintained across the seal 15 for positively driving the piston rod 14' upwardly from its BDC position after completion of the power stroke. In its downward or power stroke, the seal 15 drives hydraulic fluid out of the bore 17 through conduits 19a, 19a', and 36a into the accumulator 35. Upon reaching the BDC position, the pressure in the accumulator 35 then drives fluid back through the same conduits, into the bore 17 beneath the seal 15, to return the piston rod 14' upwardly. The bore 17 above the seal 15 may be filled with gas. The flow regulator valve 37 may be electrically or otherwise controlled to regulate the flow of hydraulic fluid between the accumulator 35 and the bore space underneath the seal 15, thereby allowing positive control over the rate of movement of the piston rod 14', both during the work stroke or down stroke, as well as the return stroke. The control input to the valve 37 may be connected to a pre-programmed means such as a control micro-processor or computer, programmed so as to achieve a particular engine cycle by controlling the motion of the work piston in this manner. The motion of a displacer piston may be also controlled in an independent manner as disclosed in U.S. Pat. No. 4,489,554 issued to this applicant.

A rotor assembly driven by the motion converter includes a cylindrical electrical commutator 90 carried by the cam ring 66 and fixed to the same by a key 92. The commutator 90 defines a cylindrical slot 93 having an inner cylindrical surface to which are mounted a number of permanent magnets 94, each of which, by way of example, may be a thin elongated strip oriented axially on the commmutator 90. A cylindrical stator electromagnetic winding 96 is fixed to the intermediate frame member 34a at its lower end in FIG. 1 and lies within the commutator slot 93 surrounding in close proximity the magnets 94. Rotation of the commutator 90 causes the magnets 94 to induce an electrical current in the stator winding 96 in a well known manner, to produce an electrical output at output conductors 98 which pass through the housing shell 24 preferably through a gas tight seal fitting (not illustrated). A cylindrical flywheel 100 is affixed to and encompasses the commutator 90 for storing angular momentum and added inertia to the rotor assembly to maintain the rotational speed of the rotor assembly as nearly constant as possible.

Although the thrust-to-torque converter system 10 has been described and illustrated as driving an electrical generator, it will be readily apparent that the novel motion converter arrangement here described is by no means limited to that particular application. For example, the converter system may instead drive a rotary hydraulic pump for charging a hydraulic accumulator. Still other applications for this converter, either in connection with external combustion engines or other drive systems, will become apparent.

The converter described above is bidirectional, i.e. capable of fully converting reciprocating linear motion to uni-directional rotation. However, the system may also be adapted to applications where only uni-directional linear thrust is converted to rotary motion and the input shaft moves freely i.e. is not loaded, on its return stroke. Such adaptation merely requires the uncoupling of one of the ball nuts 50 or 56 from the cam ring 66. This may be achieved in a number of different ways including the omission of the ball nut itself or the corresponding cam rollers which couple the ball nut to the cam shaft, among still other possibilities. In such an alternate arrangement it may be advantageous to provide a heavy flywheel 100 so as to make up with inertia for the intermittent work input into the converter system.

Figure 5:
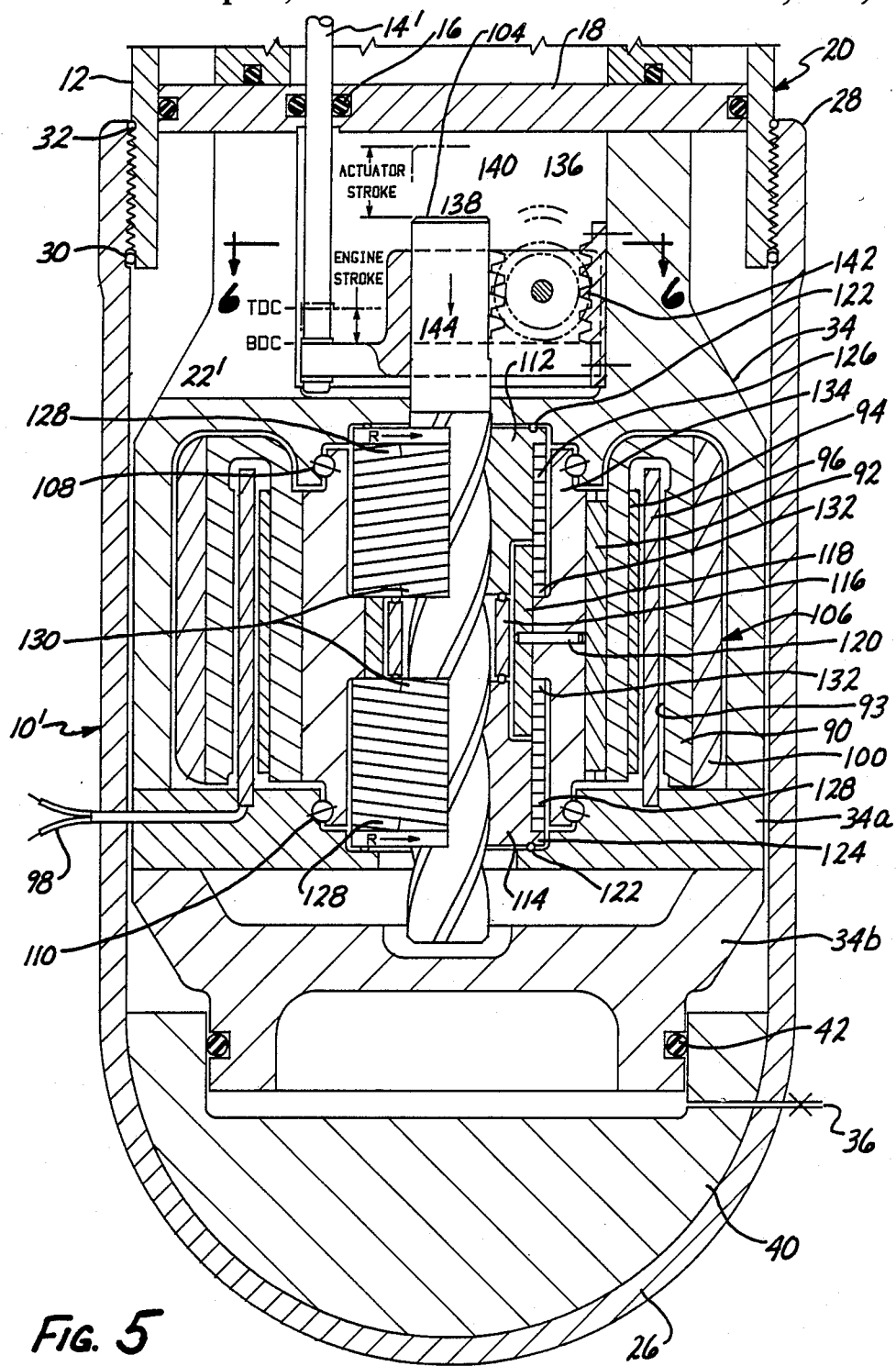
FIG. 5 is a longitudinal cross-section of a one directional linear-to-rotary motion converter according to this invention.

FIG. 5 shows an alternate thrust-to-torque converter which features lower starting thrust input to the reciprocating drive shaft 104, which is helically threaded, but at a substantilly greater thread pitch angle than the shaft 46 of FIG. 1. This modification reduces the load on the piston rods 14 and 14', particularly during engine startup when flywheel inertia must be built up. The FIG. 5 embodiment also differs from that of FIG. 1 in that the motion transfer and conversion from the reciprocating shaft 104 to the rotor assembly 106 which includes, as in the previous embodiment, a flywheel 100, a commutator 90 provided with magnets 94. In FIG. 5, the rotor assembly 106 is supported to the frame 34 by upper bearings 108 and lower bearings 110. These are both radial and thrust loading bearings. A pair of internally threaded rollers, including upper roller 112 and lower roller 114, are threaded onto the drive shaft 104 in mutually axially spaced relationship, and spaced apart by an intermediate thrust bearing assembly 116. The adjacent or inner ends of the two rollers 112, 114 are of reduced diameter and a substantial clearance fit into the opposite ends of a coupling ring 118, which is locked by a key 120 to the rotor assembly 106. The radially outer surfaces of the coupling ring 118 and outer surfaces of the two rollers 112, 114 lie along a common cylindrical plane coaxial with the shaft 104. The outer or opposite ends of the two rollers 112, 114 are supported to the frame 34 by end thrust bearings 122. Further, each roller terminates at its outer end in a radially enlarged rim 124.

A pair of clutch springs 126, 128 are each wound about a corresponding roller 112, 114 respectively, and each also is partly wound over the coupling ring 118. The coil turns of the clutch springs are of rectangular cross-section and make a close friction fit with the outer surfaces of both the respective rollers and the coupling ring 118. The outer ends 128 of the two springs make contact with the underside of the end rims 124 of each roller, while the inner ends 130 lie against annular surfaces 132 defined by the rotor carrier cylinder 134. The upper and lower springs 126, 128 are wound in opposite directions on the respective rollers. For a downward thrust of the input shaft 104, the two rollers 112, 114 are driven for rotation in a common sense indicated by arrows R in FIG. 5. The friction of the rotating rollers is transmitted to the coils of the clutch springs which, for the indicated sense of rotation, tighten up and close, ie. are "wound" onto their respective rollers, as well as the coupling ring 118, thereby transmitting rotational motion from the rollers to the coupling ring and thus to the entire rotor assembly 106.

Upon reversal of the linear motion of the drive shaft 104, i.e. for upward movement in this example, the rotation of both rollers 112, 114 is reversed, i.e. opposite to the arrows R in FIG. 5. The frictional engagement between the rollers and the corresponding clutch springs is now reversed causing the springs to unwind and thus relax their grip on the rollers, as well as the coupling ring 118. This rotary motion of the rollers is consequently lost and is not transmitted to the coupling ring which is, however, also free of the clutch springs, thus allowing the rotor assembly 106 to continue turning freely under accumulated inertia in the sense indicated by arrows R. The combination of the rollers 112, 114, the two springs 126, 128 and the coupling ring 118 operates as a pair of overrunning clutches which act to transfer rotational motion of the rollers to the rotor assembly 106 for only one sense of rotation of the rollers corresponding to a particular direction of movement of the input shaft 104.

Figure 6:
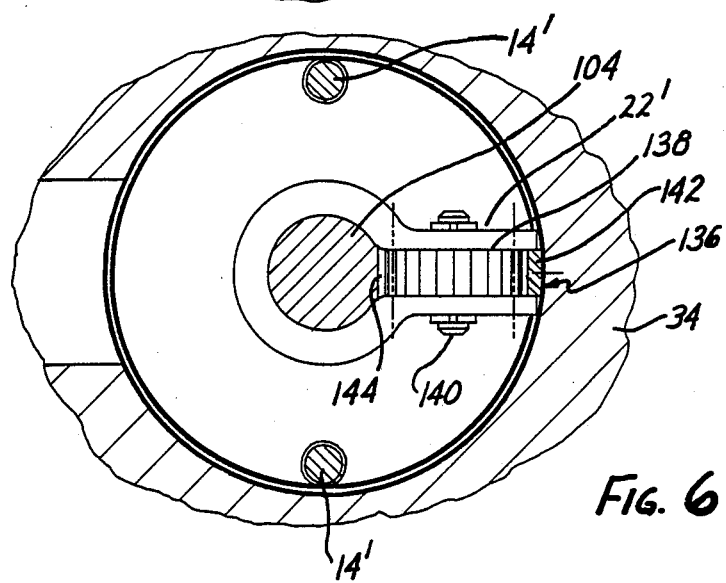
FIG. 6 is an axial cross-section taken along line 6—6 in FIG. 5.

Still another feature provided in the embodiment of FIG. 5 is a stroke doubler arrangement in which a pinion gear 138 is rotably supported on an axle 140 mounted to the drive plate 22', as better seen in FIG. 6. The pinion gear 138 is in mesh with a gear rack 142 fixed to the stationary frame 34, and is also in mesh with a second gear rack 144 which is fixed to, and extends longitudinally, on the drive shaft 104. As the drive plate 22' reciprocates with the engine output drive rods 14 and 14', the pinion 138 is carried along with the plate 22' and is forced to turn as it travels along the fixed rack 142. As a result, the stroke of the drive shaft 104 indicated as the "actuator stroke" is doubled in relation to the stroke of the drive plate 22' indicated as the "engine stroke". This doubling results from the combined linear displacement and rotational movement of the pinion gear 138, both of which are transferred to the drive shaft 104 through the second rack 144. The lengthened stroke in turn yields a doubling in the velocity of rotation of the rollers 112, 114 and consequently the speed of rotation of the rotor assembly 106 which may be desirable in an electrical generator unit such as illustrated here. The torque delivered by this double arrangement of course is halved which is no cause for concern in an arrangement such as shown here, where the engine once in operation, need only make up for electrical losses induced in the rotor assembly and where considerable inertia can be built up. Furthermore, while the lower torque does affect the start up speed of the engine/converter arrangement, it is contemplated that the motion converters disclosed herein will be used with engines having variable engine cycles which can be controlled to deliver high torque/low speed outputs when necessary for start-up conditions. Such an engine, for example, is described in the aforementioned U.S. Pat. Nos. 4,638,633, 4,723,410 and 4,722,188 issued to this applicant.

Figure 7:
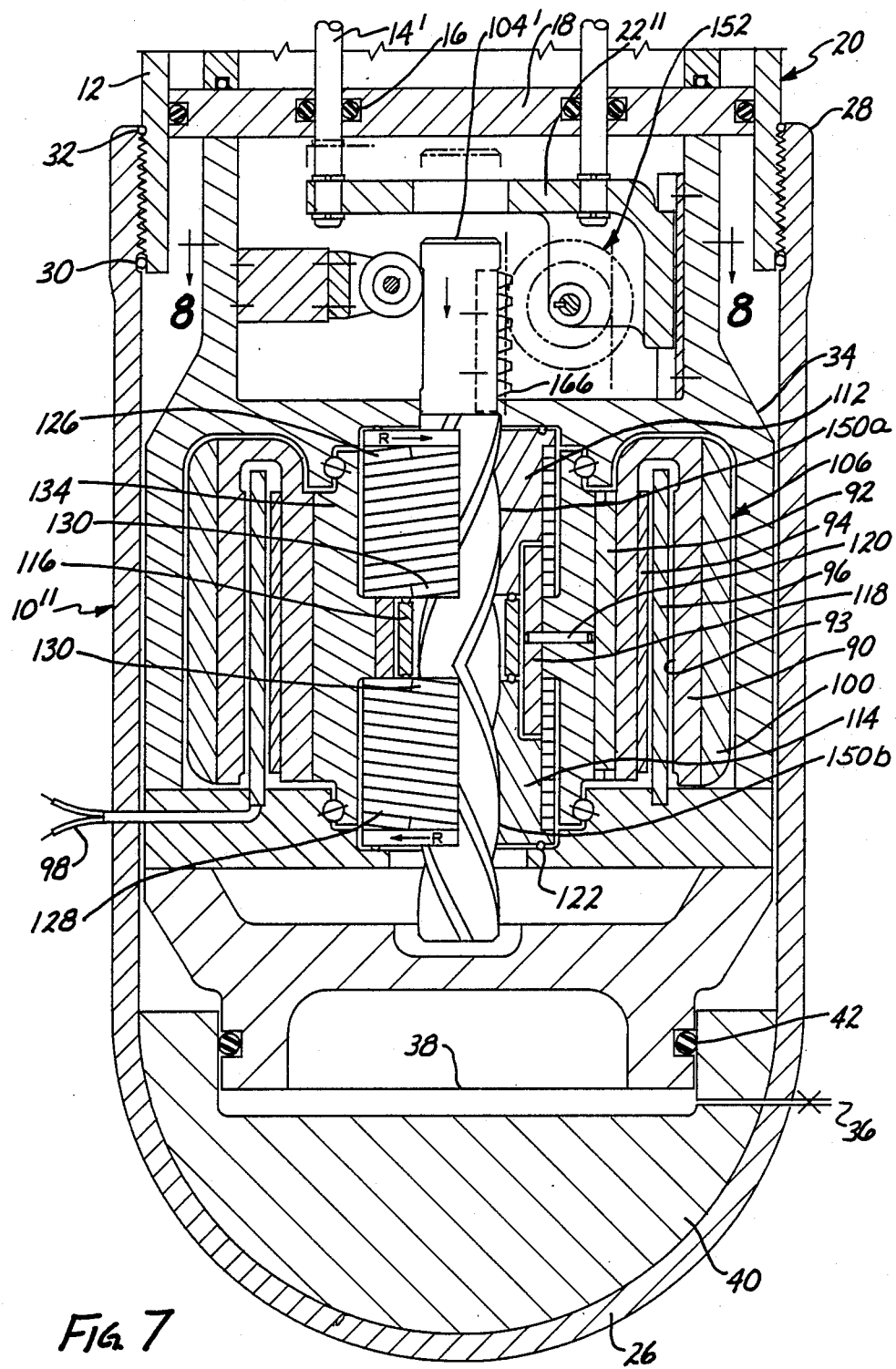
FIG. 7 is a longitudinal cross-section of an alternate bi-directional linear-to-rotary motion converter.

Turning to FIG. 7, a second alternate motion converter is shown which, in its essential respects, is similar to that of FIG. 5, but has been modified to convert bidirectional linear motion of the input shaft 104' to rotation of the rotor assembly 106. This modification is achieved by providing opposite threading 150a and 150b on corresponding portions of the drive shaft 104'. For example, the upper portion of the shaft may have clockwise helical threading, while the lower portion of the shaft in FIG. 7 may have similar, but counter-clockwise threading. This threading is of course matched internally in the rollers 112, 114 so that these two rollers now turn in mutually opposite senses for any given direction of movement of the shaft 104'. The operation of the clutch springs 126, 128 and coupler ring 118 remain as described in connection with the embodiment of FIG. 5. As a result, only one of the rollers 112, 114 is coupled to the ring 118 by its corresponding clutch spring 126, 128 for a given direction of movement of the drive shaft 104'. Consequently, the rotor assembly 106 is continuously driven for rotation in a single sense of rotation, alternately by one or the other of the rollers 112, 114 as each, in turn, becomes coupled to the ring 118 by the corresponding clutch spring as the reciprocating shaft 104 reverses its direction of movement.

Figure 8:
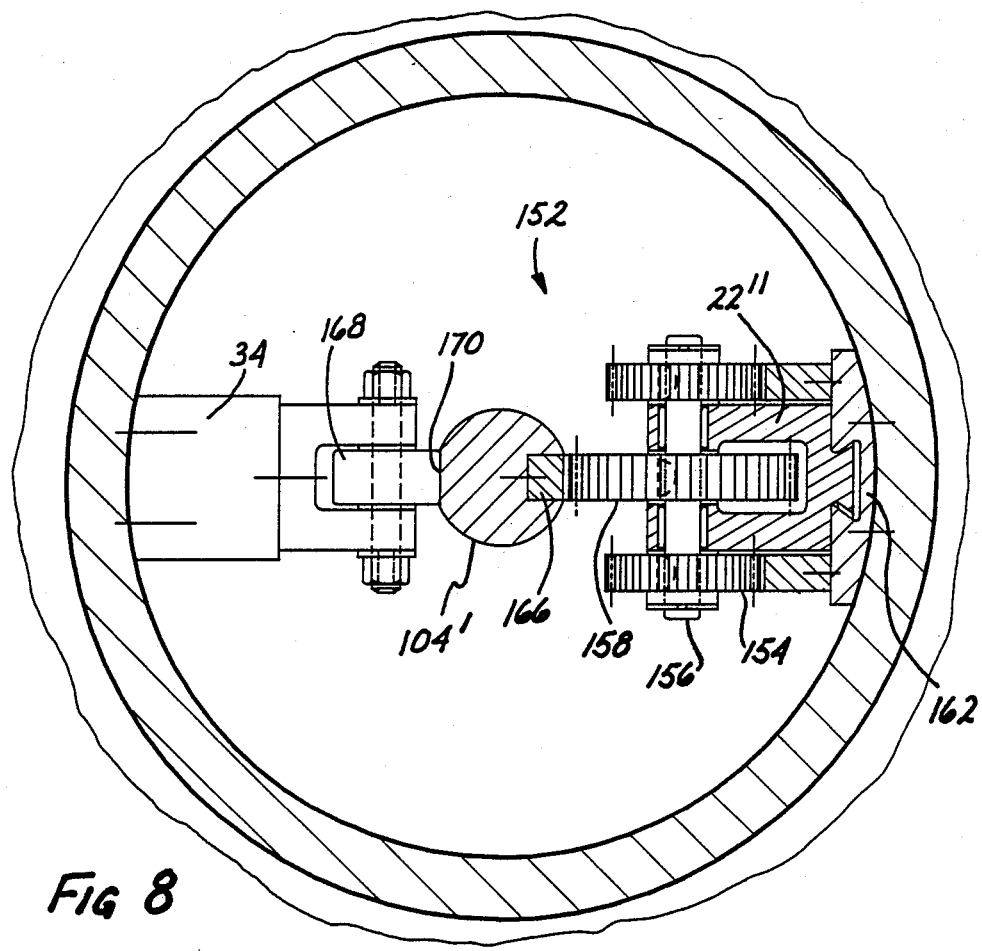
FIG. 8 is an axial cross-section taken along line 8—8 in FIG. 7.

A further feature provided in the converter 10" of FIG. 7 is a gear arrangement 152, better understood by reference to FIG. 8, and which comprises a pair of first pinion gears 154 fixed to axle 156 which in turn is rotatably mounted to the drive plate 22". A second pinion gear 158 is also fixed to the axle 156 between the two pinions 154. The drive plate 22" has an intergral dovetail slide 160 which mates into a female slide 162 fixed to the frame 34 to guide and stabilize the drive plate in its reciprocating movement. Each of the outer pinion gears 154 is in mesh with a corresponding gear rack 164 fixed to the stationary frame 34. The central pinion 158 in turn is in mesh with a rack 166 longitudinally fixed to the drive shaft 104'. A follower wheel 168 is supported to the frame 34 and rolls against a longitudinal flat 170 on the drive shaft 104', diametrically opposite to the rack 166 to balance the loads on the shaft 104' and also to hold the shaft 104' against rotation about its longitudinal axis. The gear train 152 operates to change the stroke of the shaft 104' in relation to the stroke of the drive plate 22' by a factor which is inversely related to the ratio of the inner pinion 158 to the outer pinions 154 plus the linear travel of drive plate 22'. Thus, if the gear 158 is three times the diameter of gears 154, the stroke length of the shaft 104' is tripled in addition to the linear travel distance of drive plate 22' with a corresponding increase in the velocity of lenear movement of the shaft and a similar increase in the rotational speed of the rollers 112, 114. Various gear ratios can be provided to achieve a desired rotation speed of the rotor assembly 106 and thereby match a particular rotor load to a given output of the drive engine 20.

FIG. 9 shows a modification to the earlier described converter units whereby the drive shaft 46 and ball nuts 50, 56 in FIG. 1 are combined with the overrunning clutch spring arrangements of FIGS. 5 and 7. Specifically, two rollers 212, 214 are fitted axially over corresponding ball nuts 50, 56 which, in turn, engage a drive shaft 46. Thus, the linear reciprocating motion of shaft 46 is converted to rotary motion by the two ball nuts 50, 56 which carry the rollers 212, 214. Each roller is provided with a clutch spring 126, 128 as in FIGS. 5 and 7 which act to transmit rotary motion to a coupling ring 118 and any rotor assembly keyed to the ring 118 by the key 120 as earlier described.

Although a particular presently preferred embodiment of the invention has been described and illustrated for purposes of example and clarity, it must be understood that many changes, substitutions and modifications to the described system can be made by those possessed of ordinary skill in the art without thereby departing from the spirit and scope of the present invention which is defined by the following claims.

What is claimed is:

1. A mechanical linear-to-rotary motion converter comprising:
   a housing;
   a ball bearing input screw reciprocably mounted to said housing
   a rotor;
   a first ball bearing nut coupling said input screw through a first overrunning clutch for turning said rotor in a given sense of rotation for a first direction of movement of said screw;
   a second ball bearing nut coupling said input screw through a reversing gear arrangement and a second overrunning clutch for turning said rotor in a given sense of rotation for an opposite direction of movement of said shaft;
   said first and second ball bearing nuts alternately driving said rotor for continuous rotation in said given sense responsive to linear reciprocating motion of said input shaft.

2. The converter of claim 1 further comprising electrical generator means including stator means and commutator means, one of said stator means and commutator means being affixed to said housing and cooperating with the other of said stator means and commutator means mounted to said rotor for converting mechanical input to said shaft to an electrical output.

3. The converter of claim 1 wherein said reversing gear arrangement comprises a central gear on said second ball bearing nut, a ring gear concentric to said central gear, and one or more idler gears in mesh with both said central and ring gears for turning said ring gear in a sense opposite to that of said central gear.

4. The converter of claim 3 wherein each said overrunning clutch comprises a drive ring, a cam ring and a plurality of roller bearings therebetween, each roller in a cam recess including a clutch wedge on one side of said recess for locking said roller against rotation relative to said cam ring and transmitting torque from said drive ring to said cam ring for one sense of rotation of said drive ring, said rollers being free to turn in said cam recesses for an opposite sense of rotation of said drive thereby uncoupling said cam ring from said drive ring.

5. The converter of claim 4 wherein said drive ring in one of said overrunning clutches is fixed to one of said ball bearing nuts and said drive ring in the other of said overrunning clutches is fixed to said ring gear.

6. The converter of claim 5 wherein said cam rings of both overrunning clutches are both affixed to said rotor.

7. The converter of claim 6 wherein both said cam rings are formed as an intergral cam ring unit.

8. The converter of claim 7 wherein said rotor is fixed to said cam ring unit.

9. A mechanical linear-to-rotary motion converter comprising:
   a housing;
   a ball bearing unput screw shaft reciprocably mounted to said housing for turning a first and a second driven member in a common sense responsive to linear movement of said screw shaft;
   a rotor;
   first overrunning clutch means drivingly coupling said first member to said rotor for a first sense of rotation of said first member corresponding to a first direction of movement of said screw shaft;
   a central gear;
   reversing gear means operatively coupling said second driven member and said central gear; and
   second overrunning clutch means drivingly coupling said central gear to said rotor during rotation of said second driven member in said first sense but corresponding to an opposite direction of movement of said screw shaft;
   one of said overrunning clutches being inoperative and the other overrunning clutch baeing operative for transmitting rotational motion during rotation of either of said driven members in a sense opposite to said first sense, whereby said rotor is alternately driven through said first and second overrunning clutches in a single sense of rotation responsive to linear reciprocating motion of said screw shaft.

10. A compact mechanical linear-to-rotary motion converter comprising:
    a housing;
    an input ball bearing screw shaft reciprocable to said housing, a first and a second ball bearing nut on said shaft driven in a common saense of rotation for any given direction of movement of said input shaft;
    a central gear on said second ball bearing nut, a ring gear concentric to said central gear, and one or more idler gears in mesh with both said central and ring gears for turning said ring gear in a sense opposite to that of said central gear;
    a first drive ring fixed to said first ball bearing nut and a second drive ring fixaed to said ring gear; and
    a plurality of roller bearings between each drive ring and a corresponding cam ring, each roller in a cam recess including a clutch wedge on one side of said recess for locking said roller against rotation relative to said cam ring and transmitting torque from said drive ring to said cam ring for one sense of rotation of said drive ring, said rollers being free to turn in said cam recesses for an opposite sense of rotation of said drive ring;
    whereby said cam rings are alternately driven in the same sense of rotation for either direction of movement of said input shaft.

11. The converter of claim 10 wherein both said cam rings are affixed to a rotor load.

12. The converter of claim 11 further comprising electrical generator means including stator means and commutator means, one of said stator means and commutator means being affixed to said housing and cooperating with the other of said stator means and commutator means mounted to said rotor load for converting mechanical input to said shaft to an electrical output.

13. A mechanical linear-to-rotary motion converter comprising:
    a housing, a threaded input shaft reciprocable to said housing, a rotor supported in said housing coaxially to said shaft;

first and second threaded rollers axially spaced on said shaft driven in a common sense of rotation for a given direction of movement of said drive shaft;

a coupling ring axially intermediate said rollers and fixed to said rotor; and overrunning clutch means coupling said ring to both said rollers for a single sense of rotation of said rollers, said clutch means disengaging for the opposite rotation of said rollers thereby driving said rotor in said single sense.

14. The converter of claim 13 wherein said overrunning clutch means comprisae clutch spring means wound about said rollers and said ring.

15. The converter of claim 14 further comprising inner bearing means axially separating said rollers and outer bearing means supporting the opposite ends of said rollers for rotation relative to said housing.

16. The converter of claim 14 further comprising input means adapted to be driven by a reciprocating engine output shaft, gear means on said input means in mesh with a first rack fixed to said housing and a second rack fixed to said shaft, whereby the stroke of said shaft is doubled relative to the stroke of said input means.

17. A mechanical linear-to-rotary motion converter comprising:

a housing, an input shaft reciprocable to said housing, said shaft being treaded in opposite directions on first and second portions thereof;

a rotor supported in said housing coaxially to said shaft;

first and second rollers each on a corresponding one of said shaft portions and driven for mutually opposite rotation for a given direction of movement of said input shaft;

a coupling ring axially intermediate said rollers and fixed to said rotor; and overrunning clutch means coupling said ring to both said rollers for a single sense of rotation of said rollers, said clutch means disengaging for the opposite rotation of said rollers thereby continuously driving said rotor in said single sense for either direction of said shaft.

18. The converter of claim 17 wherein said overrunning clutch means comprise clutch spring means wound about said rollers and said ring.

19. The converter of claim 17 further comprising inner bearing means axially separating said rollers and outer bearing means supporting the opposite ends of said rollers to said housing.

20. The converter of claim 17 further comprising input means adapted to be driven by a reciprocating engine output shaft, first gear and second gear means fixaed for rotation on a common axle on said input means, said first gear means in mesh with a first rack fixed to said housing, said second gear means in mesh with a second rack fixed to said shaft, whereby the stroke of said shaft is related to the stroke of said input means in proportion to the ratio between said gear means.

* * * * *